(12) United States Patent
Kim et al.

(10) Patent No.: US 11,456,765 B2
(45) Date of Patent: Sep. 27, 2022

(54) ELECTRONIC DEVICE FOR REMOVING SELF-INTERFERENCE SIGNAL AND METHOD OF OPERATING THE SAME

(71) Applicant: Samsung Electronics Co., Ltd., Suwon-si (KR)

(72) Inventors: Joontae Kim, Seoul (KR); Gangminh Lee, Seoul (KR); Daeyoung Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/209,754

(22) Filed: Mar. 23, 2021

(65) Prior Publication Data

US 2022/0045704 A1 Feb. 10, 2022

(30) Foreign Application Priority Data

Aug. 4, 2020 (KR) .......................... 10-2020-0097538

(51) Int. Cl.
| | |
|---|---|
| *H04L 5/12* | (2006.01) |
| *H04B 1/10* | (2006.01) |
| *H04B 1/04* | (2006.01) |
| *H04B 15/04* | (2006.01) |

(52) U.S. Cl.
CPC ......... *H04B 1/1018* (2013.01); *H04B 1/0475* (2013.01); *H04B 15/04* (2013.01)

(58) Field of Classification Search
CPC ..... H04B 1/1018; H04B 1/0475; H04B 15/04
USPC ....................................................... 375/262
See application file for complete search history.

(56) References Cited

U.S. PATENT DOCUMENTS

| | | | | |
|---|---|---|---|---|
| 6,011,952 A | * | 1/2000 | Dankberg | ............... H04B 1/126 455/24 |
| 6,996,164 B1 | * | 2/2006 | Blount | ................... H04B 1/525 375/219 |
| 9,231,801 B2 | | 1/2016 | Rimini et al. | |
| 9,871,576 B2 | | 1/2018 | Kwon et al. | |
| 9,923,658 B2 | | 3/2018 | Xue et al. | |
| 10,277,359 B2 | | 4/2019 | Choi et al. | |
| 2003/0031279 A1 | * | 2/2003 | Blount | ................... H04B 1/525 375/346 |

(Continued)

FOREIGN PATENT DOCUMENTS

| | | |
|---|---|---|
| JP | 2008-172466 A | 7/2008 |
| KR | 10-1220049 B1 | 1/2013 |

OTHER PUBLICATIONS

European Search Report dated Jan. 18, 2022 for corresponding EP Patent Application No. 21186529.0.

*Primary Examiner* — Helene E Tayong
(74) *Attorney, Agent, or Firm* — Harness, Dickey & Pierce, P.L.C.

(57) ABSTRACT

A wireless communication device includes a transmission radio frequency (RF) chain configured to transmit a radio signal, and processing circuitry configured to cause the wireless communication device to detect that the transmission RF chain has transited from an inactive state to a first active state, determine whether to detect an updated value of a phase of a self-interference signal in response to detecting that the transmission RF chain has transited from the inactive state to the first active state, and modify a weight vector of an adaptive filter corresponding to the self-interference signal based on the updated value of the phase or a previous value of the phase.

20 Claims, 11 Drawing Sheets

(56) References Cited

U.S. PATENT DOCUMENTS

| | | |
|---|---|---|
| 2009/0061805 A1 | 3/2009 | Kim et al. |
| 2012/0140685 A1* | 6/2012 | Lederer ............... H04L 27/3854 370/286 |
| 2013/0044791 A1 | 2/2013 | Rimini et al. |
| 2014/0269864 A1 | 9/2014 | Aparin |
| 2015/0139122 A1 | 5/2015 | Rimini et al. |
| 2017/0085252 A1 | 3/2017 | Sheikh et al. |

* cited by examiner

ELECTRONIC DEVICE FOR REMOVING SELF-INTERFERENCE SIGNAL AND METHOD OF OPERATING THE SAME

CROSS-REFERENCE TO RELATED APPLICATION

This application is based on and claims priority under 35 U.S.C. § 119 to Korean Patent Application No. 10-2020-0097538, filed on Aug. 4, 2020, in the Korean Intellectual Property Office, the disclosure of which is incorporated by reference herein in its entirety.

BACKGROUND

The inventive concepts relate to an electronic device and a method of operating the electronic device, and more particularly, to an electronic device for removing a self-interference signal having a random phase component and a method of operating the electronic device.

Wireless communication systems may employ various techniques to increase throughput. For example, wireless communication systems may employ multiple-input and multiple-output (MIMO) for increasing communication capacity by using a plurality of antennas. As techniques for increasing throughput are employed, transmission sides may transmit signals having high complexity and reception sides may process the signals having high complexity.

Interference signals may hinder the reception sides from processing signals received through antennas, and the interference signals may be variously generated. For example, the interference signals may include inter-cell interference, which is a signal received at a boundary of a serving base station from a neighboring base station, intra-cell interference, which corresponds to a radio signal of another terminal within coverage of a serving base station, channel interference, and the like.

In particular, in the situation of weak electric fields, inter-cell interference, intra-cell interference, and channel interference, which may be considered external signals, have reduced signal intensity due to the weak electric fields, whereas self-interference signals experienced by user equipment due to feedback and reception of transmission signals of the same user equipment, from among all interference signals, may rather have increased influence on reception sensitivity. Therefore, there is demand for a method of more efficiently removing such self-interference signals.

SUMMARY

The inventive concepts provide an electronic device capable of efficiently removing a self-interference signal by detecting or estimating a phase of a transmission signal, and a method of operating the electronic device.

According to an aspect of the inventive concepts, there is provided a wireless communication device including a transmission radio frequency (RF) chain configured to transmit a radio signal, and processing circuitry configured to cause the wireless communication device to detect that the transmission RF chain has transited from an inactive state to a first active state, determine whether to detect an updated value of a phase of a self-interference signal in response to detecting that the transmission RF chain has transited from the inactive state to the first active state, and modify a weight vector of an adaptive filter corresponding to the self-interference signal based on the updated value of the phase or a previous value of the phase.

According to an aspect of the inventive concepts, there is provided a method of operating a wireless communication device, the method including detecting that a transmission radio frequency (RF) chain has transited from an inactive state to a first active state, the transmission RF chain being configured to transmit a radio signal, determining whether to detect an updated value of a phase of a self-interference signal in response to the detecting, and modifying a weight vector of an adaptive filter corresponding to the self-interference signal based on the updated value of the phase or a previous value of the phase.

According to an aspect of the inventive concepts, there is provided a wireless communication device including a transmission radio frequency (RF) chain configured to transmit a radio signal, and processing circuitry configured to cause the wireless communication device to detect that the transmission RF chain has transited from an inactive state to a first active state, determine to detect an updated value of a phase of a self-interference signal in response to detecting that the transmission RF chain has transited from the inactive state to the first active state, detect the updated value of the phase of the self-interference signal in response to the determination, and modify a weight vector of an adaptive filter corresponding to the self-interference signal based on the updated value of the phase of the self-interference signal.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Hereinafter, example embodiments of the inventive concepts will be described in detail with reference to the accompanying drawings.

Figure 1A:
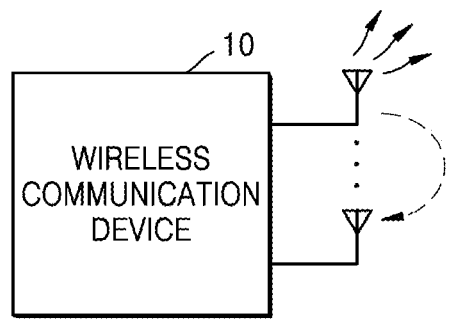
FIGS. 1A and 1B each illustrate an example of a self-interference signal according to example embodiments of the inventive concepts.
Figure 1B:
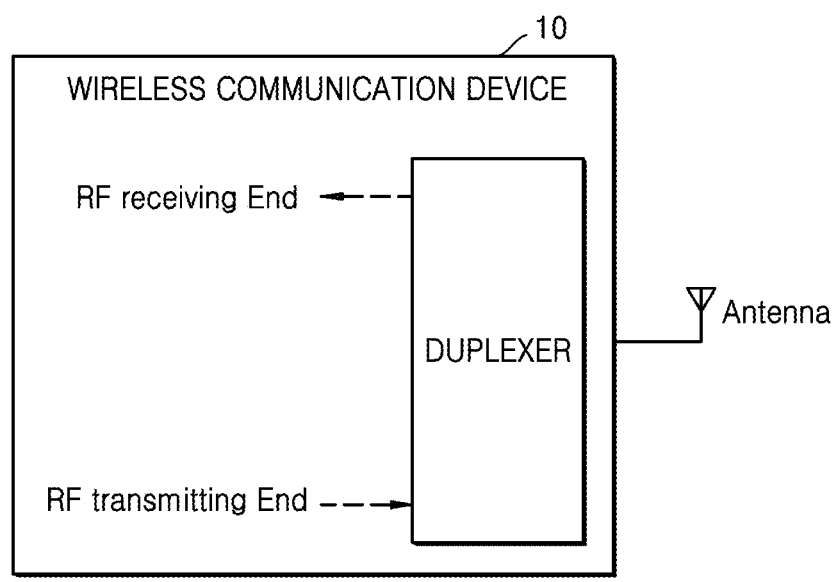

FIGS. 1A and 1B each illustrate an example of a self-interference signal according to example embodiments of the inventive concepts.

In particular, FIG. 1A illustrates a self-interference signal of a wireless communication device 10 including multiple antennas, and FIG. 1B illustrates the self-interference signal of the wireless communication device 10 including a single antenna.

Referring to FIG. 1A, the wireless communication device 10 may include a plurality of antennas. At least some of the plurality of antennas may correspond to a transmission antenna(s). The transmission antenna(s) may transmit radio signals to an external device (for example, another user equipment (UE), and/or a base station (BS)) other than the wireless communication device 10. The remaining ones of the plurality of antennas may correspond to a reception antenna(s). The reception antenna(s) may receive radio signals from the external device.

According to example embodiments, the reception antenna(s) may receive radio signals transmitted from the transmission antenna(s) as well as the radio signals transmitted from the external device. For example, when the transmission antenna(s) and the reception antenna(s) respectively correspond to omnidirectional antennas and are arranged adjacent to each other, some of the transmitted radio signals may be fed back through the reception antenna(s). The fed-back radio signals may correspond to self-interference signals.

Referring to FIG. 1B, the wireless communication device 10 may include a single antenna. The single antenna may be connected to both a transmission radio frequency (RF) chain and a reception RF chain via a duplexer. That is, the wireless communication device 10 may receive radio signals through the reception RF chain in a receiving mode and may transmit baseband signals to the external device through the transmission RF chain in a transmitting mode.

According to example embodiments, in the case of the wireless communication device 10 including the single antenna, feedback of transmission signals based on the transmission antenna and the reception antenna, which are adjacent to each other, may not occur. However, because the duplexer is connected to both the transmission RF chain and the reception RF chain, at least some of the transmission signals may be leaked from the transmission RF chain. When the leaked signals are input to the reception RF chain, the leaked signals may act as self-interference signals.

According to example embodiments, it may be seen that self-interference signals may be generated regardless of the number of antennas included in the wireless communication device 10. Therefore, techniques for removing the self-interference signals may be desirable.

Figure 2:
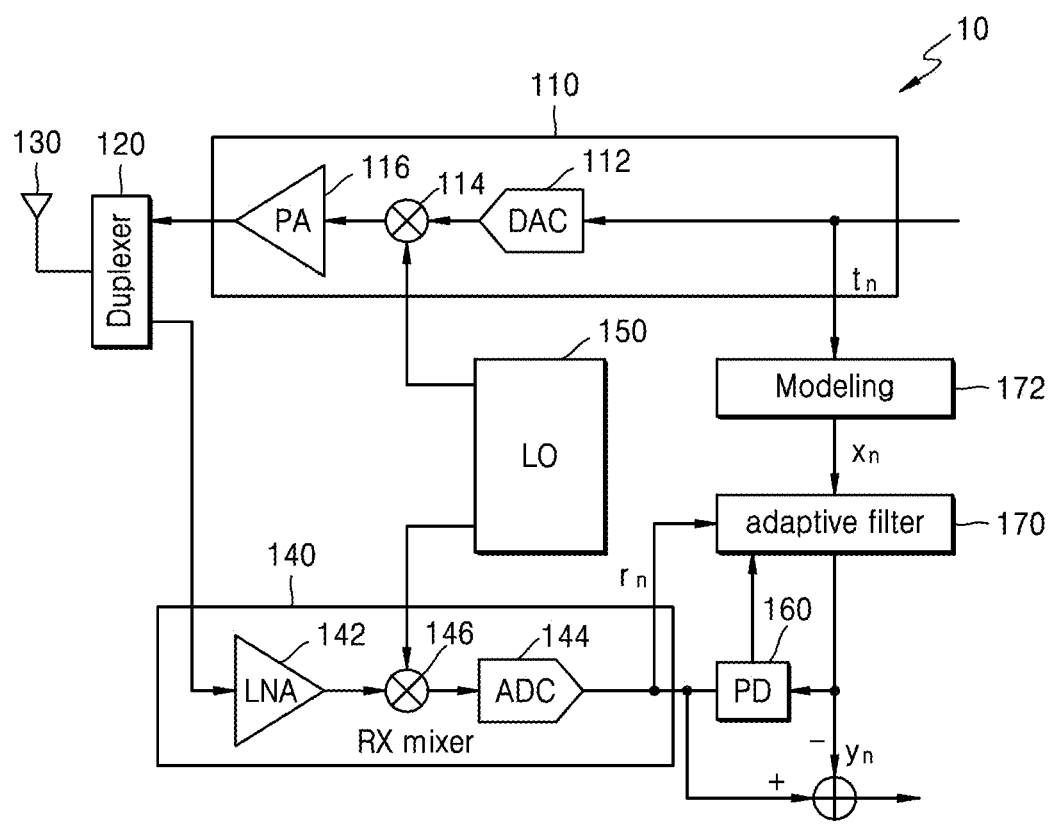
FIG. 2 is a block diagram of a wireless communication device according to example embodiments of the inventive concepts.

FIG. 2 is a block diagram of a wireless communication device according to example embodiments of the inventive concepts.

Referring to FIG. 2, the wireless communication device 10 may include a transmission RF chain 110, a duplexer 120, an antenna 130, a reception RF chain 140, a local oscillator 150, a phase detector 160, and/or an adaptive filter 170. According to example embodiments, the wireless communication device may be a cellular phone, a smart phone, a Personal Digital Assistant (PDA), a wireless modem, a tablet computer, a laptop computer, a personal computer (PC), an Internet of Things (IoT) device, a smart watch, a virtual reality device, etc.

According to example embodiments, the transmission RF chain 110 may refer to a transmission path for converting a digital signal in a baseband into an analog signal to transmit the analog signal as a radio signal. The digital signal in the baseband may be converted into the analog signal, a frequency in the baseband may be upconverted into a carrier frequency, and the analog signal may be amplified to have sufficient (e.g., a desired) transmission power. According to example embodiments, the wireless communication device 10 may generate the digital signal (e.g., by performing signal processing such as encoding, etc.) containing signal data. The signal data may be used by a receiving device to, for example, convert the signal data to sound data (e.g., using a speaker), control a physical device (e.g., using a motor, solenoid, etc.), output visual data (e.g., using a display), etc.

According to example embodiments, the transmission RF chain 110 may include a digital-to-analog converter (DAC) 112, a transmission mixer 114, and/or a power amplifier 116. The transmission mixer 114 may upconvert a frequency of a baseband signal into a carrier frequency by receiving a reference frequency from the local oscillator 150, and summing up the reference frequency and the frequency of the baseband signal. The power amplifier 116 may finally amplify power before transmission through the antenna 130.

According to example embodiments, the duplexer 120 may be connected to the transmission RF chain 110 and the reception RF chain 140, and may activate one thereof. For example, when the wireless communication device 10 is in the transmitting mode, the duplexer 120 may activate a connection to the transmission RF chain 110, and when the wireless communication device 10 is in the receiving mode, the duplexer 120 may activate a connection to the reception RF chain 140. By employing the duplexer 120, the inclusion of respective antennas for a plurality of RF chains may be bypassed.

According to example embodiments, the reception RF chain 140 may receive a radio signal with a carrier frequency and downconvert the radio signal into an intermediate frequency or a baseband frequency, and the reception RF chain 140 may refer to a reception path for converting a frequency-downconverted analog signal into a digital signal.

According to example embodiments, the reception RF chain 140 may include a low noise amplifier (LNA) 142, an analog-to-digital converter (ADC) 144, and/or a reception mixer 146. The LNA 142 may correspond to an amplifier that reduces or minimizes noise by amplifying wireless RF signals received by the antenna 130. The ADC 144 may convert an analog signal amplified by the LNA 142 into a digital signal, and the reception mixer 146 may receive the reference frequency from the local oscillator 150 and may downconvert the analog signal into a frequency obtained by subtracting the reference frequency from a frequency of the analog signal.

According to example embodiments, the phase detector 160 may detect or estimate a phase of an input signal. For example, when the transmission RF chain 110 transits from an inactive state to an active state, a phase of a transmission signal may be changed. The phase detector 160 may perform phase detection on the transmission signal having the changed phase and transfer the transmission signal to the adaptive filter 170.

According to example embodiments, the adaptive filter 170, which is a filter adaptively adjustable according to an input signal, may refer to a filter having an adaptively corresponding filter coefficient (or parameter) according to statistical characteristics of the input signal. The adaptive filter 170 may perform adaptive filtering on the input signal, based on a least mean square (LSM) algorithm or a recursive least square (RLS) algorithm.

According to example embodiments, the wireless communication device 10 may further include a modeling circuit 172. The modeling circuit 172 may generate a modeling interference signal from the transmission signal in the baseband, based on the effective channel vector regarding the self-interference, and deliver the generated modeling interference signal to the adaptive filter 170.

According to example embodiments, the adaptive filter 170 may receive, from the modeling circuit 172, the modeling interference signal $x_n$ generated by modeling a transmission signal $t_n$ in the baseband as a self-interference signal, and may regenerate an actual interference signal $y_n$ by using the modeling interference signal $x_n$ and a digital-converted reception signal $r_n$, thereby removing the interference signal $y_n$ from the reception signal $r_n$. An output signal, from which the self-interference signal is removed, may be represented as follows.

$$\tilde{r}_n = r_n - y_n \quad \text{[Equation 1]}$$

In Equation 1, $\tilde{r}_n$ denotes the output signal from which the self-interference signal is removed, $r_n$ denotes the digital-converted reception signal, and $y_n$ denotes the interference signal. Here, the interference signal $y_n$ may be rewritten as follows.

$$y_n = \Sigma_{k=0}^{L-1} w_k^* x_{n-k} = w^H X_n \quad \text{[Equation 2]}$$

In Equation 2, w denotes an effective channel vector regarding an interference path, and $x_n$ denotes a signal obtained by stacking the interference signal $x_n$ modeled from the transmission signal $t_n$ according to the effective channel vector by as much as L. That is, it may be represented that $x_n^T = [x_n \ldots x_{n-L+1}]$.

Figure 3A:
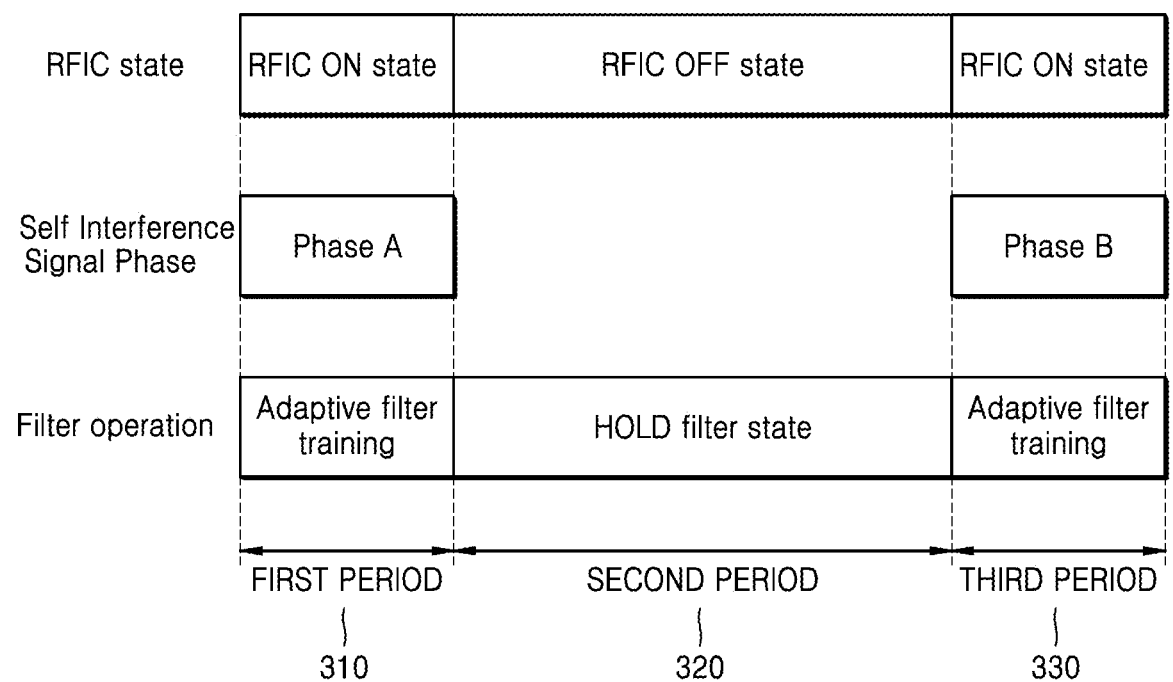
FIG. 3A illustrates a comparison example of self-interference removal using adaptive filtering.

FIG. 3A illustrates a comparison example of self-interference removal using an adaptive filter.

Referring to FIG. 3A, in a first period 310, a state of the wireless communication device 10 may correspond to an active state or an ON state. Specifically, during the first period 310, the transmission RF chain 110 (may also be referred to herein as an RF Integrated Circuit (RFIC)) of the wireless communication device 10 may be activated. The wireless communication device 10 may transmit a transmission signal (Tx signal) through the activated transmission RF chain 110. During the first period 310, the reception RF chain 140 of the wireless communication device 10 may also be activated. During the first period 310, the wireless communication device 10 may receive a reception signal (Rx signal) through the activated reception RF chain 140. The reception signal may include a self-interference signal that is based on the transmission signal.

According to example embodiments, the self-interference signal received during the first period 310 may have a phase A. The phase of the self-interference signal during the first period 310 may flexibly change over time, and hereinafter, the phase A is assumed to be a certain constant of 0° for convenience of description.

According to example embodiments, the adaptive filter 170 may perform adaptive filter training on the self-interference signal received during the first period 310. The adaptive filter training may refer to following the phase of the self-interference signal. For example, even when the phase of the self-interference signal changes in real time, the adaptive filter 170 may follow a phase change of the self-interference signal by updating a weight vector regarding an $n^{-th}$ sample by using an $n^{-th}$ received sample and a weight vector regarding an $n-1^{-th}$ sample. That is, adaptive filter training performed in the first period 310 may allow the adaptive filter 170 to almost remove the self-interference signal, because weight vectors regarding a plurality of samples have already been updated.

In a second period 320, the state of the wireless communication device 10 may correspond to an inactive state or an OFF state. Specifically, the inactive state or the OFF state may indicate that the transmission RF chain 110 of the wireless communication device 10 is in the inactive state. For example, the transmission mixer 114 of the transmission RF chain 110 may be changed to the OFF state. That is, because the wireless communication device 10 may receive a radio signal at any time, the reception RF chain 140 may be continuously maintained in the ON state. On the other hand, when there is no signal to be transmitted by the wireless communication device 10, to reduce power consumption of the wireless communication device 10, the transmission RF chain 110 may enter the inactive state for at least some periods. That is, the second period 320 may refer to a period in which the transmission RF chain 110 is deactivated. Because there is no signal transmitted by the wireless communication device 10, there may also be no self-interference signal. Accordingly, there may be no value of the phase of the self-interference signal.

According to example embodiments, the adaptive filter 170 may enter a hold state during the second period 320. The hold state may refer to a state of storing a weight vector tracked until a time point of the end of the first period 310.

In a third period 330, the state of the wireless communication device 10 may correspond to the active state or the ON state. That is, after the second period 320 is terminated, at the same time as, or a similar time to, the start of the third period 330, the transmission RF chain 110 may transit again to the active state or the ON state. For example, in the third period 330, the transmission mixer 114 may be changed from the inactive state to the active state.

According to example embodiments, the phase of the self-interference signal in the third period 330 may be different from the phase of the self-interference signal in the first period 310. When the transmission RF chain 110 is activated again, due to the nature of elements included in the transmission RF chain 110, RF characteristics (for example, phases) may not be identical or similar to those in the first period 310. Accordingly, when the transmission RF chain 110 is activated again in the third period 330, the self-interference signal may have a random or different phase. Hereinafter, the phase of the self-interference signal in the third period 330 will be referred to as a phase B. For example, the phase B may be 180°.

Specifically, the transmission RF chain 110 of the wireless communication device 10 may be activated during the first period 310. The wireless communication device 10 may transmit the transmission signal (Tx signal) through the activated transmission RF chain 110. The reception RF chain 140 of the wireless communication device 10 may also be activated during the first period 310. During the first period 310, the wireless communication device 10 may receive the reception signal (Rx signal) through the activated reception RF chain 140. The reception signal may include the self-interference signal that is based on the transmission signal.

According to example embodiments, the self-interference signal received during the first period 310 may have the phase A. The phase of the self-interference signal during the first period 310 may flexibly change over time, and hereinafter, the phase A is assumed to be a certain constant of 0° for convenience of description.

According to example embodiments, the adaptive filter 170 may perform adaptive filter training on the self-interference signal received during the first period 310. The adaptive filter training may refer to following the phase of the self-interference signal. For example, even when the phase of the self-interference signal changes in real time, the adaptive filter 170 may follow the phase change of the self-interference signal by updating the weight vector regarding the $n^{-th}$ sample by using the $n^{-th}$ received sample and the weight vector regarding the $n-1^{-th}$ sample. That is, the adaptive filter training performed in the first period 310 may allow the adaptive filter 170 to at least partially remove the self-interference signal, because the weight vectors regarding the plurality of samples have already been updated.

Figure 3B:
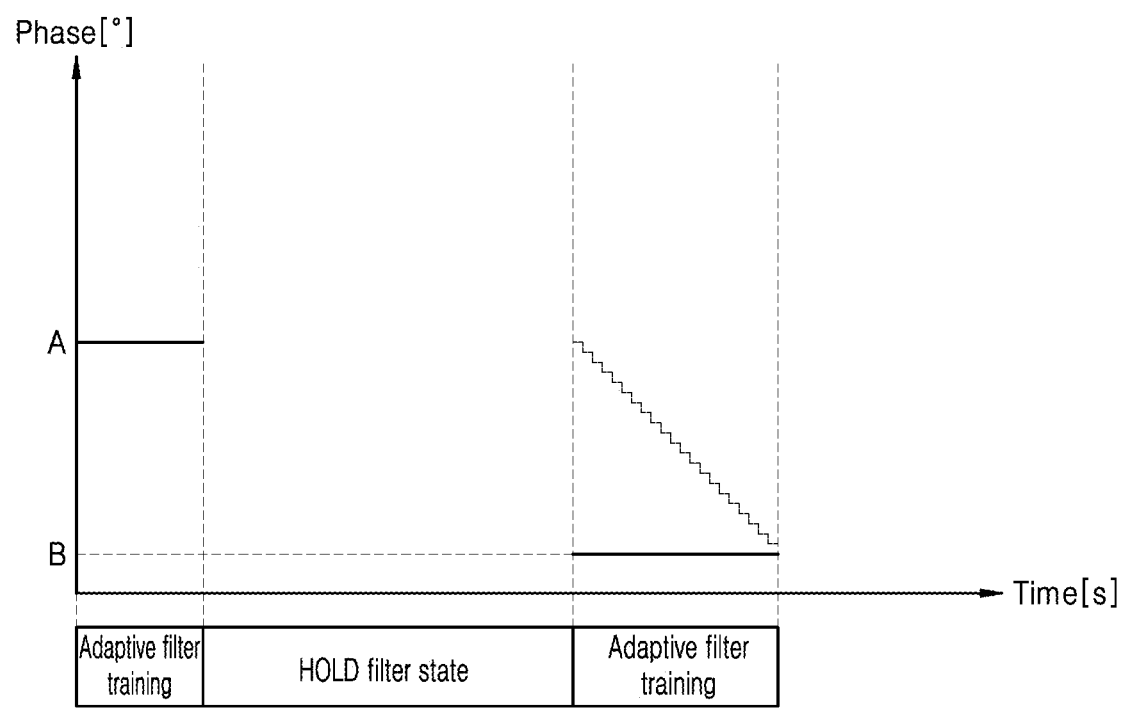
FIG. 3B illustrates a phase-time graph corresponding to self-interference removal using adaptive filtering.

FIG. 3B illustrates a phase-time graph corresponding to self-interference removal using adaptive filtering.

Referring to FIG. 3B, the phase of the self-interference signal during the first period 310, and a phase-time graph of the adaptive filter 170 that follows the phase of the self-interference signal may be referred to. In the first period 310, the phase of the self-interference signal may be illustrated as having a certain value of a phase, and, for example, the phase of the self-interference signal may correspond to 120° (illustrated as phase A). In example embodiments, the phase of the self-interference signal, which is followed by the adaptive filter 170, may also approximate to 120°. Because the phase of the self-interference signal has been estimated and detected for the plurality of samples before the first period 310, the detected phase by the adaptive filter 170 and the phase of the self-interference signal may be locked.

During the second period 320, the adaptive filter 170 may enter a hold state. That is, the transmission RF chain 110 of the wireless communication device 10 may be deactivated during the second period 320. For example, when there is no data to be transmitted, to reduce the power consumption, at least the transmission mixer 114 of the transmission RF chain 110 may be deactivated. The adaptive filter 170 may not perform training regarding the weight vector during the second period 320. The reason is that, because there is no transmission signal due to the deactivation of the transmission RF chain 110, the self-interference signal is not received either. That is, the adaptive filter 170 may maintain the value of the phase of the self-interference signal, which is last stored at a time point of the end of the first period 310 or the start of the second period 320, without performing an update or training regarding the weight vector.

In the third period 330, the wireless communication device 10 may transit the transmission RF chain 110 again to the active state. However, due to the nature of an RF device, even when the RF device transits from the inactive state to the active state again, the RF device may not maintain RF characteristics in the previously inactive state. Accordingly, in the third period 330, the phase of the self-interference signal may be randomly determined or different. For example, although the phase of the self-interference signal in the first period 310 is 120°, after the entrance into the inactive state, despite the transition to the active state again, the self-interference signal in the third period 330 may not maintain a phase of 120°. In the third period 330, the phase of the self-interference signal after the active state may be changed to, for example, 10° (illustrated as phase B).

In a comparison example in which the phase detector 160 is not used, the adaptive filter 170 may remove the self-interference signal by using the weight vector that is previously stored. That is, although the weight vector used by the adaptive filter 170 is based on the premise that the phase of the self-interference signal is 120°, because the phase of the self-interference signal is abruptly changed to 10° in the third period 330, a significant error may occur and it may fail to efficiently remove the self-interference signal. The adaptive filter 170 may adaptively perform update or training regarding the weight vector in the direction of reducing the magnitude of the error. As shown in FIG. 3B, the adaptive filter 170 may reach 10°, which is the phase of the self-interference signal, by measuring the error whenever every sample is received and updating the weight vector in the direction of reducing the error. However, in the case of using the adaptive signal processing technique described above, a large number of samples, corresponding to a lengthy delay, may be acquired before reaching the phase of the self-interference signal, and during this time period, there may be deterioration in reception sensitivity because the self-interference signal is not being efficiently removed.

Figure 4:
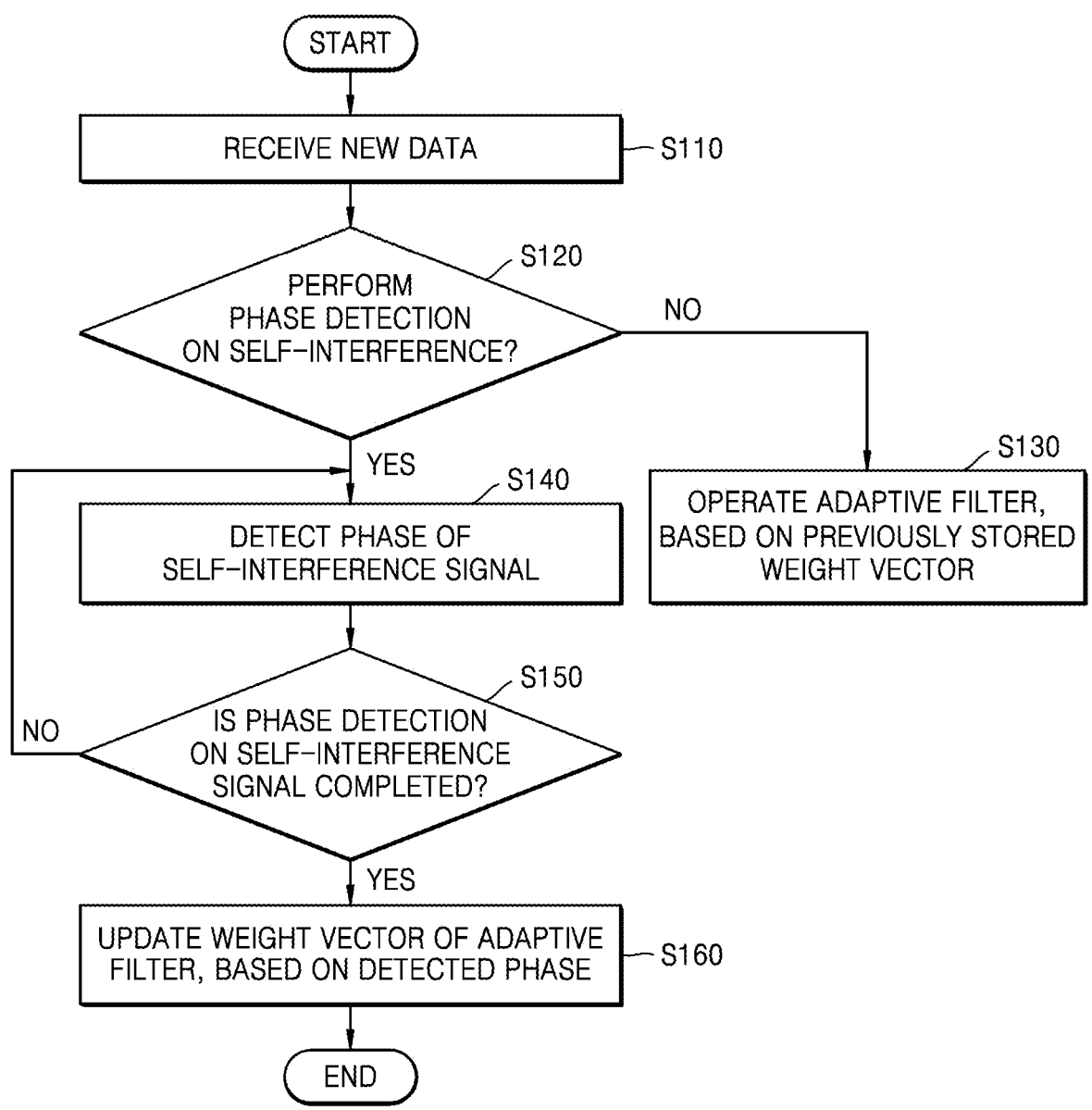
FIG. 4 illustrates operations performed by a wireless communication device, according to example embodiments of the inventive concepts.

FIG. 4 illustrates operations performed by a wireless communication device, according to example embodiments of the inventive concepts.

Referring to FIG. 4, in operation S110, the wireless communication device 10 may receive new data (e.g., via the reception RF chain 140). The new data (also referred to herein as a new data signal) may refer to, for example, data received after the transmission mixer 114 transits from the inactive state to the active state.

In operation S120, the wireless communication device 10 may determine whether phase detection should be performed. For example, the wireless communication device 10 may determine that the phase detection of the self-interference signal should be performed, based on the fact that the transmission mixer 114 has transited from the inactive state to the active state. That is, the wireless communication device 10 may consider the transition of the transmission mixer 114 to the active state and a total time period for which the transmission mixer 114 is in the inactive state. The reason is that the transmission mixer 114 may not enter the inactive state during brief pauses in data transmission.

In operation S130, the wireless communication device 10 may perform a normal operation on the adaptive filter 170. The normal operation may refer to an operation of removing the self-interference signal, based on the weight vector updated until a time point at which the transmission mixer 114 enters the inactive state (e.g., a previous value of the phase). That is, because it has been determined in operation S120 that the phase detection on the self-interference signal should not be performed, the self-interference signal may be removed based on the latest weight vector previously stored. According to example embodiments, the normal operation may include modifying (e.g., updating) the weight vector based on the previous value of the phase.

In operation S140, the wireless communication device 10 may detect the phase (e.g., an updated value of the phase) of the self-interference signal by using samples received for a predefined or alternatively, given time period. The predefined or alternatively, given time period may correspond to a time period for receiving a minimum or sufficient number of samples to detect the phase of the self-interference signal.

In operation S150, the wireless communication device 10 may determine whether the phase detection is completed. The completion of the phase detection may be based on a magnitude of an error occurring when the self-interference signal is removed according to phases obtained by using the samples received for the predefined or alternatively, given time period in operation S140. According to example embodiments, the error measures an extent to which the new data signal is altered by the self-interference signal.

For example, when the magnitude of the error is greater than a threshold value, the wireless communication device 10 may determine that it is still early to terminate the phase detection on the self-interference signal (e.g., the wireless communication device 10 may determine that the phase detection on the self-interference signal is not completed). When the magnitude of the error is greater than the threshold value, the wireless communication device 10 may directly calculate the phase of the self-interference signal again (operation S140) until the magnitude of the error is detected to be less than the threshold value. As another example, when the magnitude of the error is less than the threshold value, the wireless communication device 10 may determine that the wireless communication device 10 has successfully followed the random phase changed in the third period 330 (e.g., the wireless communication device 10 may determine that the phase detection on the self-interference signal is completed).

In operation S160, the wireless communication device 10 may modify (e.g., update) the weight vector. In operation S150, when the phase of the self-interference signal has been successfully detected, the weight vector indicating an effective channel regarding the self-interference may be changed based on the detected phase (e.g., the updated value of the phase). According to example embodiments, the wireless communication device 10 may filter the new data signal using the modified weight vector and/or the adaptive filter 170 to obtain a filtered new data signal. The wireless communication device 10 may use the new data included in the filtered new data signal to, e.g., convert the new signal data to sound data (e.g., using a speaker of the wireless communication device 10), control a physical device (e.g., using a motor, solenoid, etc.), convert the new signal data to visual data (e.g., using a display of the wireless communication device 10), etc.

That is, in the case where the wireless communication device 10 is based on the adaptive signal processing technique generally used in the related art, the wireless communication device 10 may follow the changed phase of the self-interference signal only when performing training by using a large number of samples, and because the wireless communication device 10 is not capable of modeling the self-interference signal during the reception of the large number of samples, the wireless communication device 10 may not avoid deterioration in reception sensitivity caused by the self-interference signal.

However, according to example embodiments, it is determined that the RF characteristics of the transmission RF chain 110 are changed, the phase of the self-interference signal is preemptively detected according thereto, and the self-interference signal is removed by the adaptive filter 170 by using the detected phase, whereby a time period for removing the self-interference signal may be reduced as compared with the case of using the adaptive signal processing technique set forth above.

Figure 5:
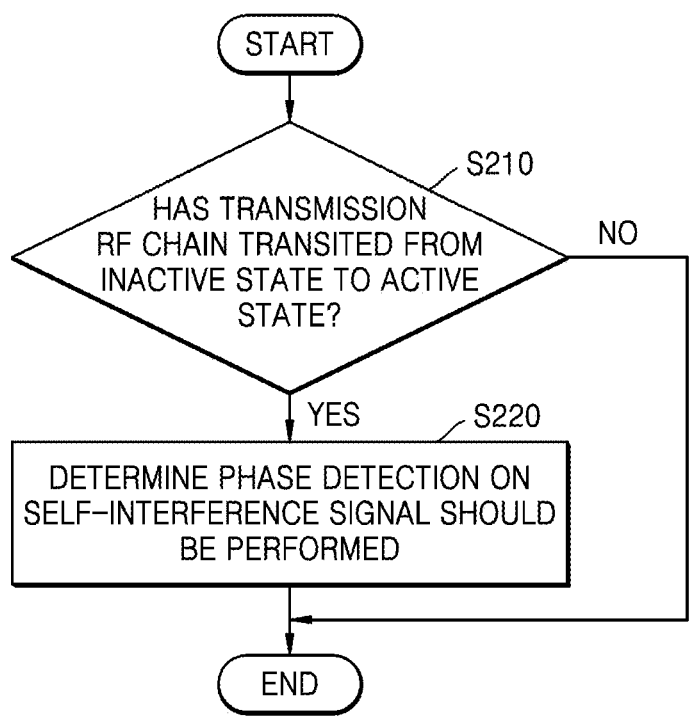
FIG. 5 illustrates operations performed for determining whether to perform phase detection, according to example embodiments of the inventive concepts.

FIG. 5 illustrates operations for determining whether to perform phase detection, according to example embodiments of the inventive concepts. In particular, FIG. 5 may correspond to detailed operations of operation S120 in FIG. 4.

Referring to FIG. 5, in operation S210, the wireless communication device 10 may determine whether the transmission RF chain 110 has transited from the inactive state to the active state. When the transmission RF chain 110 has never transited, or has not recently transited, from the inactive state to the active state, because the self-interference signal may be removed by using the recently updated weight vector, the wireless communication device 10 may not perform the phase detection on the self-interference signal.

In operation S220, in response to identifying that the transmission RF chain 110 has transited from the inactive state to the active state, the wireless communication device 10 may determine that the phase detection on the self-interference signal should be performed. Specifically, the wireless communication device 10 may determine to perform the phase detection on the self-interference signal, based on whether the transmission mixer 114 of the transmission RF chain 110 has transited from the inactive state to the active state.

Figure 6A:
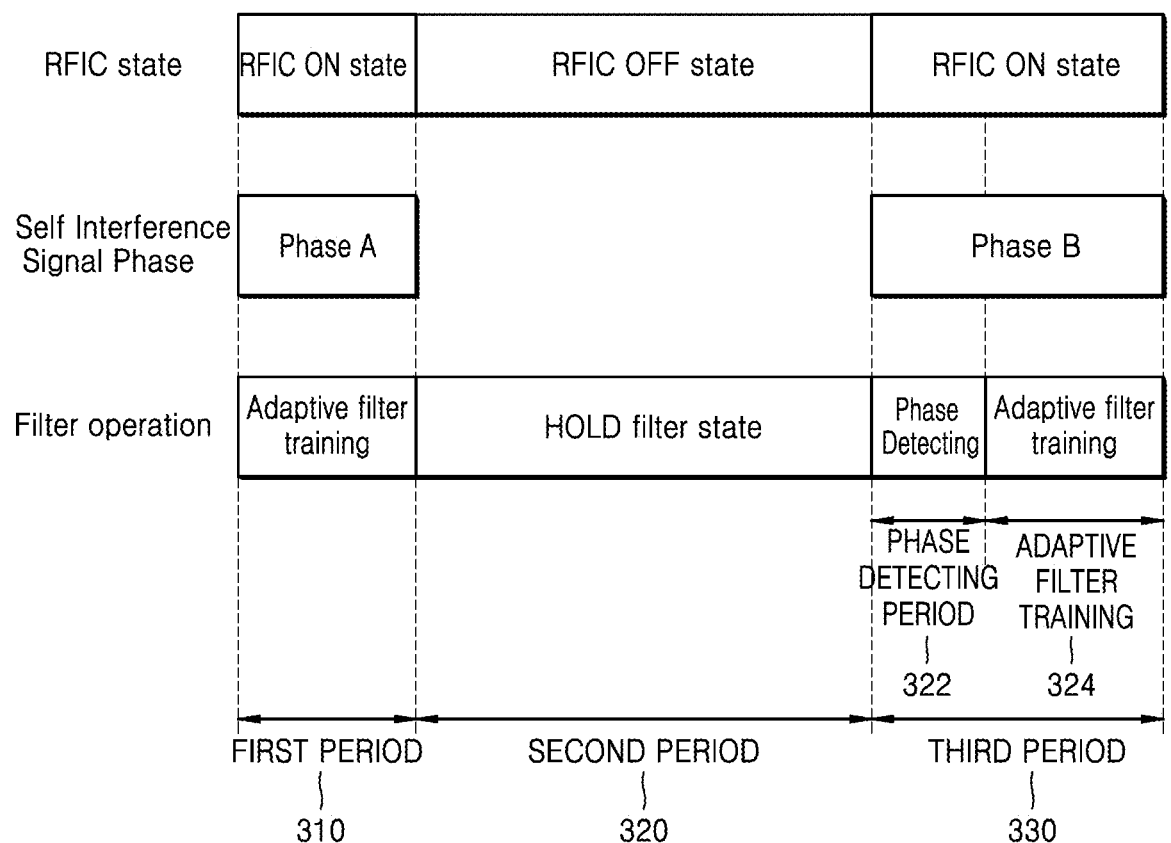
FIG. 6A illustrates an example of self-interference removal according to example embodiments of the inventive concepts.

FIG. 6A illustrates an example of self-interference removal according to example embodiments of the inventive concepts. Repeated descriptions given with reference to FIG. 3A are omitted.

Referring to FIG. 6A, the wireless communication device 10 may perform the phase detection on the self-interference signal first, in response to the entrance into the third period 330. That is, the wireless communication device 10 may detect the changed phase of the self-interference signal in the third period 330 by using the phase detector 160.

Next, in response to having detected the phase of the self-interference signal, the wireless communication device 10 may operate the adaptive filter 170 according to the detected phase. For example, when the phase of the self-interference signal in the third period 330 is 120° and the phase detected by the phase detector 160 is equally, or similarly, 120°, the training of the adaptive filter 170 may be terminated after being performed on only one sample. In this case, because the phase detected on the self-interference signal is equal or similar to the actual phase thereof, the error may be output close to 0. Accordingly, the adaptive filter 170 may follow the phase of the self-interference signal while continuously updating the weight vector regarding additionally received samples. In comparison with FIG. 3B, the reception sensitivity deteriorates only during the time taken for the phase detector 160 to detect or estimate the phase of the self-interference signal, and after the phase detector 160 has detected the phase of the self-interference signal, the weight vector may be updated according to the detected phase, and the self-interference signal may be efficiently removed according to the updated weight vector. That is, the wireless communication device 10 according to example embodiments may remove the self-interference signal more quickly by improving the speed at which the weight vector of the adaptive filter 170 converges to the phase of the self-interference signal.

Figure 6B:
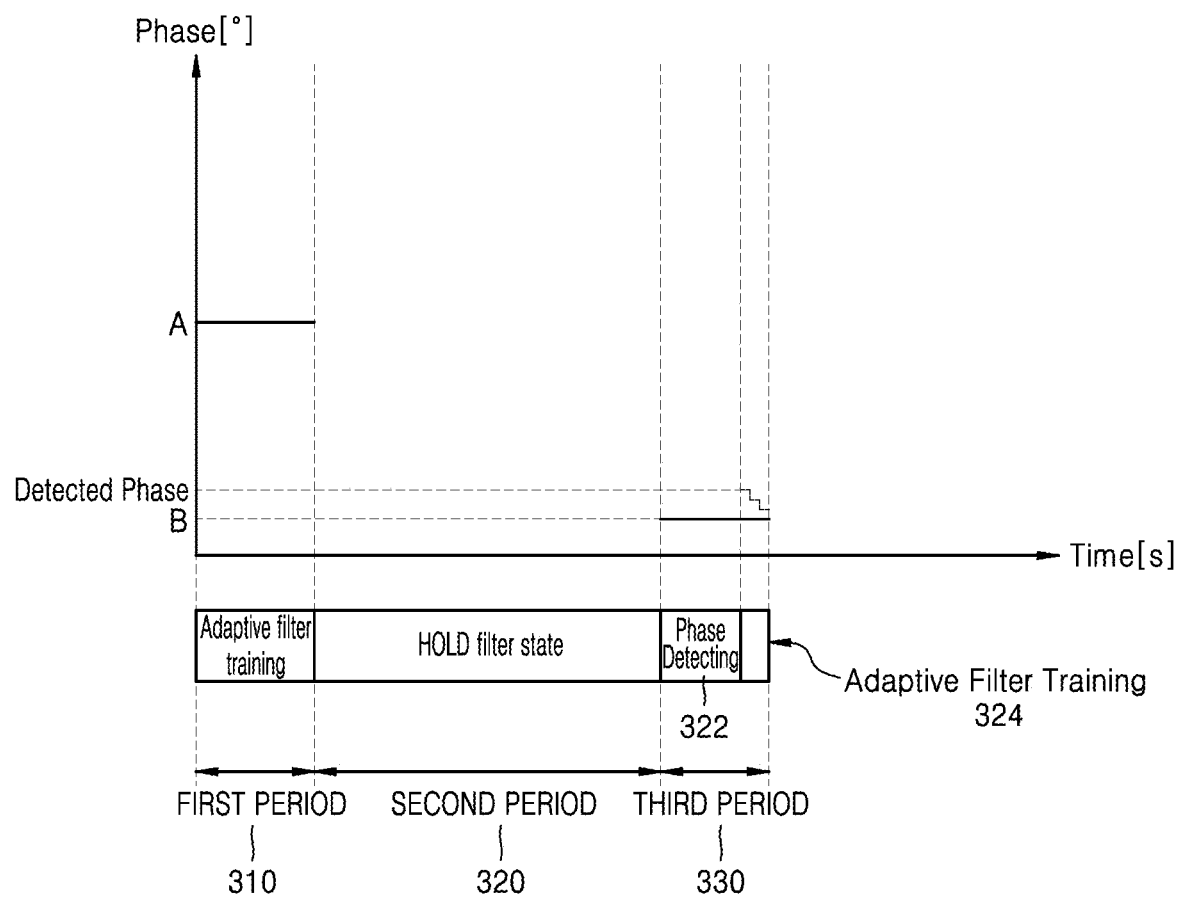
FIG. 6B illustrates a phase-time graph corresponding to the example of self-interference removal, according to example embodiments of the inventive concepts.

FIG. 6B illustrates a phase-time graph corresponding to an example of self-interference removal, according to example embodiments of the inventive concepts. Repeated descriptions given with reference to FIG. 3B are omitted.

Referring to FIG. 6B, the third period 330 may include a phase detecting period 322 and an adaptive filter training period 324. The phase detecting period 322 is a period in which only the phase detector 160 operates, and in the phase detecting period 322, the phase detector 160 may detect or estimate the phase of the self-interference signal by using a received sample.

The adaptive filter training period 324 may be a period in which the adaptive filter 170 receives information about the detected phase from the phase detector 160 and, based thereon, performs an update of the weight vector regarding the self-interference signal and removal of the self-interference signal.

That is, referring to FIG. 6A, the wireless communication device 10 may detect the phase of the self-interference signal first, and then, may update the weight vector of the adaptive filter 170 according to the detected phase. According to example embodiments, the wireless communication device 10 may modify the weight vector based on a previous value of the phase by rotating the previous value of the phase by as much as the updated value of the phase (e.g., the wireless communication device 10 may rotate the previous value of the phase until the value of the phase becomes equal or similar to the updated value of the phase).

Figure 7A:
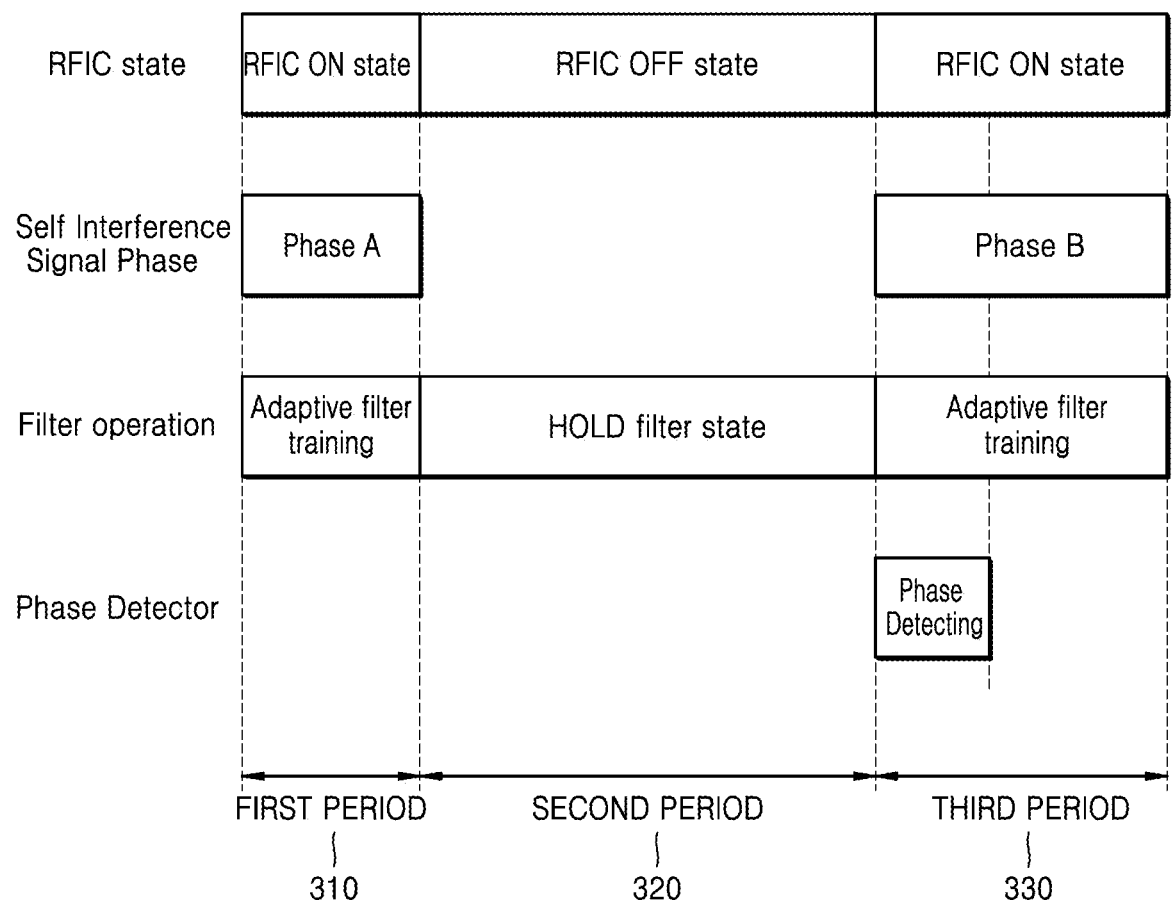
FIG. 7A illustrates another example of self-interference removal, according to example embodiments of the inventive concepts.

FIG. 7A illustrates another example of self-interference removal, according to example embodiments of the inventive concepts. Repeated descriptions given with reference to FIG. 6A are omitted.

Referring to FIGS. 6A and 7A, during the third period 330, the wireless communication device 10 may perform the phase detection in parallel with the adaptive filter training. That is, while the phase detector 160 detects or estimates the phase of the self-interference signal, the adaptive filter 170 may simultaneously or contemporaneously perform training regarding the weight vector in the direction of reducing the error.

For example, it may be assumed that the phase of the self-interference signal in the first period 310 is 120°, and that the phase of the self-interference signal after the transition to the active state again in the third period 330 is 10°. The phase detector 160 may detect the phase of the self-interference signal by detecting or estimating the phase of the self-interference signal from the time point of the start of the third period 330. The phase of the self-interference signal, which is detected by the phase detector 160, may correspond to 10°. In parallel therewith, the adaptive filter 170 may update the weight vector based on the weight vector lastly updated at the time point of the end of the first period 310. That is, when the third period 330 starts, the adaptive filter 170 may remove the self-interference signal having a phase of 10° by using the weight vector that is set when the self-interference signal having a phase of 120° is removed. Here, the adaptive filter 170 may calculate the error and may estimate the weight vector regarding a self-interference signal in the direction of reducing the calculated error.

According to example embodiments, after the phase detection by the phase detector 160 is terminated, the adaptive filter 170 may receive a phase output value from the phase detector 160. The adaptive filter 170 may determine the weight vector according to the phase output value. The adaptive filter 170 may compare the magnitude of the error according to the weight vector, which is determined according to the phase output value (e.g., an updated value of the phase), with the magnitude of the error according to the weight vector updated from the time point of the start of the third period 330 (e.g., based on a previous value of the phase). According to example embodiments, the adaptive filter 170 may determine a first magnitude of a first weight vector based on the previous value of the phase, and a second magnitude of the error of a second weight vector based on the updated value of the phase. The adaptive filter 170 may select one of the weight vectors (e.g., the first weight vector or the second weight vector) according to the phase output value of the phase detector 160 and/or the continuously updated weight vector, based on a result of comparing the magnitudes of the errors. According to example embodiments, the adaptive filter 170 may set the selected weight vector as the weight vector of the adaptive filter 170.

Figure 7B:
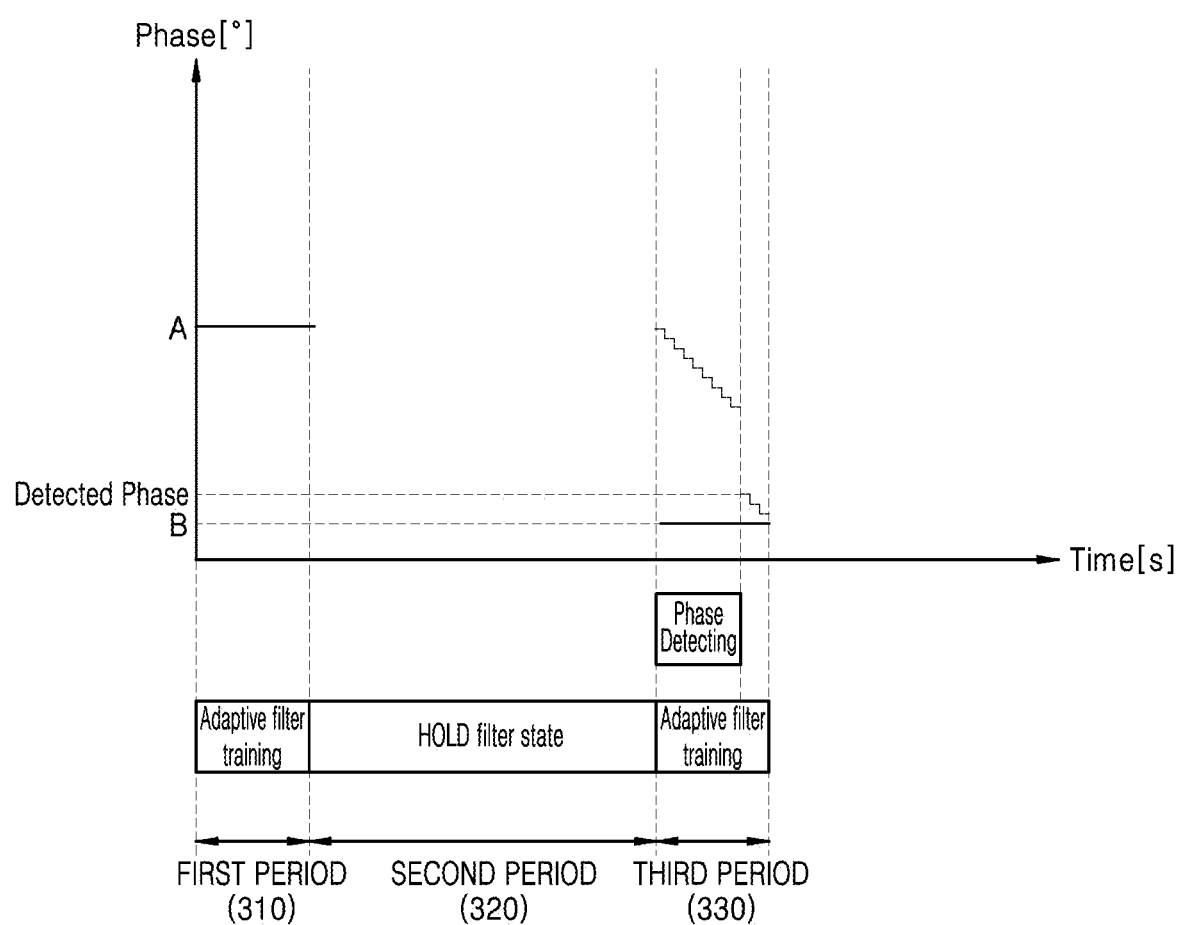
FIG. 7B illustrates a phase-time graph corresponding to the other example of self-interference removal, according to example embodiments of the inventive concepts.

FIG. 7B illustrates a phase-time graph corresponding to another example of self-interference removal, according to example embodiments of the inventive concepts. Repeated descriptions given with reference to FIG. 6B are omitted.

Referring to FIG. 7B, during the third period 330, the wireless communication device 10 may simultaneously or contemporaneously perform the phase detection of the self-interference signal by using the phase detector 160 and the update of the weight vector by using the adaptive filter 170.

As shown in the graph, the adaptive filter 170 may determine either one of the weight vectors at the time point of the end of the phase detection. One of the weight vectors may be the weight vector according to the phase detected by the phase detector 160, and the other may be the weight vector updated from the time point of the start of the third period 330 in the direction of reducing the error.

According to example embodiments, the adaptive filter 170 may measure an error on, or corresponding to, newly received data according to each of the weight vectors and may determine the weight vector such that a value of the measured error is smaller.

As an example, when a change in the phase of the self-interference signal between the first period 310 and the third period 330 is not large (for example, the phase in the first period 310 is 120° and the phase in the third period 330 is 100°), the magnitude of the error according to the weight vector updated by the adaptive filter 170 may be less than the magnitude of the error according to the weight vector that is based on the detected phase.

As another example, when the change in the phase of the self-interference signal between the first period 310 and the third period 330 is large (for example, the phase in the first period 310 is 120° and the phase in the third period 330 is 10°), even though the update is performed by the adaptive filter 170, an approximation to the weight vector of the actual interference signal would be achieved only by repeating the update for a sufficiently large number of samples. Accordingly, the adaptive filter 170 may select the weight vector according to the phase output value of the phase detector 160 such that the magnitude of the error is smaller.

Figure 8:
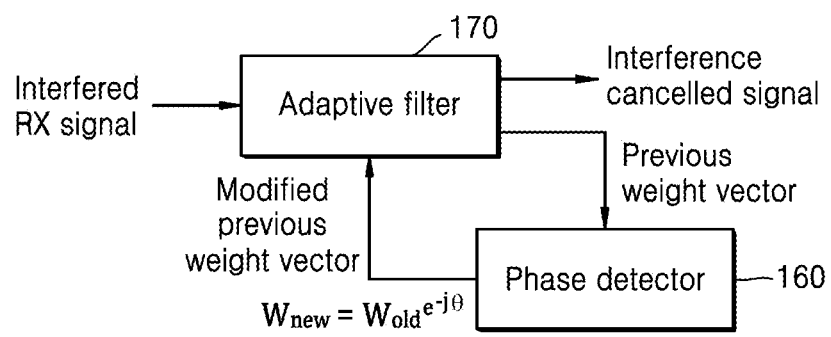
FIG. 8 illustrates an adaptive filter according to example embodiments of the inventive concepts.

FIG. 8 illustrates an adaptive filter and a phase detector, according to example embodiments of the inventive concepts.

Referring to FIG. 8, the phase detector 160 may receive the weight vector from the adaptive filter 170. The weight vector may correspond to, or be, an effective channel vector regarding (e.g., corresponding to or characterizing) the self-interference channel. The phase detector 160 may receive the weight vector from the adaptive filter 170, may generate a new weight vector by multiplying the weight vector by the detected phase, and may transfer the generated new weight vector to the adaptive filter 170 as an updated weight vector. The adaptive filter 170 may remove the self-interference signal from newly input data according to the updated weight vector.

According to example embodiments, the phase detector 160 may directly estimate a changed phase of the self-interference signal by using L samples.

$$\hat{\theta} = \operatorname*{argmin}_{\theta} \sum_{n=0}^{L-1} |r_n - w_{old}^H x_n \cdot e^{j\theta}|^2 = \operatorname*{argmin}_{\theta} \|r^T - e^{j\theta} w_{old}^H X\|^2 \qquad \text{[Equation 3]}$$

In Equation 3, $r_n$ denotes an input received by a receiver at an $n^{-th}$ time, $w_{old}^H$ denotes a latest weight vector estimated by the adaptive filter 170 for interference removal, $x_n$ denotes a modeling interference signal generated from the transmission signal $t_n$ by nonlinear modeling to make the self-interference signal included in $r_n$, and $e^{j\theta}$ denotes a random phase value generated according to RF characteristics when the transmission RF chain 110 transits to the active state in the third period 330. The phase estimation value may be rewritten as follows.

$$\hat{\theta} = \angle(r^T X^H w_{old}) \quad \text{[Equation 4]}$$

In Equation 4, the matrix X may be defined as $[x_0\ x_1\ \ldots\ x_{L-1}]$.

According to example embodiments, the phase detector 160 may be bypassed. Specifically, the phase value (e.g., the updated value of the phase) may be directly calculated (e.g., by the wireless communication device) by using L pieces of sample data and may reduce complexity by calculating the phase estimation value only for particular candidates (e.g., a predetermined or alternatively, given number of phase candidates).

For example, the phase estimation value for the candidates may be rewritten as follows.

[Equation 5]

$$\hat{\theta}_{MLD} \stackrel{\Delta}{=} \arg\min_{\theta \in CandidateSet} \sum_{n=0}^{L-1} |r_n - w^H x_n \cdot e^{j\theta}|^2 \quad \text{[Equation 5]}$$

For example, the candidates for θ may be set to be 0°, 90°, 180°, and 270°. Because a value of $y=w^H x_n$ may be calculated (e.g., by the wireless communication device 10) only once for each phase included in the candidates, a phase (e.g., a phase candidate) minimizing, or corresponding to a lowest, a Euclidean distance may be selected by rotating a corresponding complex number as follows. In addition, when the candidates are set at intervals of 90°, the complexity of calculations for newly updating the weight vector may also be reduced as follows. According to example embodiments, the wireless communication device 10 may rotate a first value of a phase of the weight vector (e.g., the phase of the weight vector maintained in the inactive state) according to a phase candidate minimizing, or corresponding to a lowest, magnitude of error of a reception signal from among the phase candidates.

$$w_{new,n} = w_{old,n} e^{-j\theta} = \begin{cases} \text{Re}(w_{old,n}) + j\text{Im}(w_{old,n}) & \theta = 0 \\ \text{Im}(w_{old,n}) - j\text{Re}(w_{old,n}) & \theta = \frac{1}{2}\pi \\ -\text{Re}(w_{old,n}) - j\text{Im}(w_{old,n}) & \theta = \pi \\ -\text{Im}(w_{old,n}) + j\text{Re}(w_{old,n}) & \theta = \frac{3}{2}\pi \end{cases} \quad \text{[Equation 6]}$$

According to example embodiments, the phase detector 160 may also reduce the complexity by mapping the phase estimation value of Equation 4 to one of the candidates. According to example embodiments, the detected phase (e.g., the updated value of the phase) may be mapped (e.g., by the wireless communication device 10) to a predefined or alternatively, given number of candidates (e.g., phase candidates) according to a position at which the detected phase is positioned (e.g., plotted) on a complex plane. According to example embodiments, the wireless communication device 10 may modify (e.g., rotate) a phase of the weight vector (e.g., based on the previous value of the phase of the self-interference signal and/or one or more of the candidate phases) based on the mapped phase candidates.

$$\hat{\theta}_{QMLE} = Q(\angle r^T X^H w_{old}) \quad \text{[Equation 7]}$$

In Equation 7, Q(•) denotes a function for quantizing a phase of a complex number. For example, the quantization refers to dividing $r^T X^H w = \alpha + j\beta$ into a real part (Re) and an imaginary part (Im) and may be simplified as follows for a candidate point of a phase change.

$$\hat{\theta}_{QMLE} = \begin{cases} 0, & \alpha \geq \beta \text{ and } \alpha \geq -\beta \\ \frac{1}{2}\pi, & \alpha < \beta \text{ and } \alpha \geq -\beta \\ \pi, & \alpha < \beta \text{ and } \alpha < -\beta \\ \frac{3}{2}\pi, & \alpha \geq \beta \text{ and } \alpha < -\beta \end{cases} \quad \text{[Equation 8]}$$

Referring to Equation 8, when the phase of the complex number falls within −45° to 45°, the phase estimation value may be quantized to 0. The phase detector 160 may perform training on the adaptive filter 170 while reducing the complexity through the quantization.

According to example embodiments, operations described herein as being performed by the wireless communication device 10, the transmission RF chain 110, the duplexer 120, the reception RF chain 140, the local oscillator 150, the phase detector 160, the adaptive filter 170 and/or the modeling circuit 172 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to example embodiments thereof, it will be understood that various changes in form and details may be made therein without departing from the spirit and scope of the following claims.

What is claimed is:

1. A wireless communication device comprising:
    a transmission radio frequency (RF) chain configured to transmit a radio signal; and
    processing circuitry configured to cause the wireless communication device to,
        detect that the transmission RF chain has transited from an inactive state to a first active state,
        determine whether to detect an updated value of a phase of a self-interference signal in response to detecting that the transmission RF chain has transited from the inactive state to the first active state, and
        modify a weight vector of an adaptive filter corresponding to the self-interference signal based on the updated value of the phase or a previous value of the phase,
    wherein the processing circuitry is configured to cause the wireless communication device to determine whether to detect the updated value of the phase of the self-interference signal including determining whether a duration period of the inactive state is greater than a threshold time.

2. The wireless communication device of claim 1, wherein the transmission RF chain comprises a transmission mixer, a digital-to-analog converter (DAC), and a power amplifier.

3. The wireless communication device of claim 2, wherein the updated value of the phase in the first active state after the inactive state is different from the previous value of the phase in a second active state before the inactive state.

4. The wireless communication device of claim 1, wherein the processing circuitry is configured to cause the wireless communication device to:
    detect the updated value of the phase; and
    modify the weight vector according to the updated value of the phase in response to completing the detection of the updated value of the phase.

5. The wireless communication device of claim 1, wherein the processing circuitry is configured to cause the wireless communication device to:
    detect the updated value of the phase; and
    modify the weight vector based on the previous value of the phase during the detection of the updated value of the phase, the previous value of the phase corresponding to a time point at which the inactive state is entered.

6. The wireless communication device of claim 5, wherein the processing circuitry is configured to cause the wireless communication device to:
    determine a first magnitude of an error of a first weight vector and a second magnitude of the error of a second weight vector, the first weight vector being based on the previous value of the phase, the first magnitude of the error of the weight vector being modified during the detection of the updated value of the phase, and the second weight vector being based on the updated value of the phase; and
    set one of the first weight vector or the second weight vector as the weight vector of the adaptive filter according to which among the first magnitude of the error and the second magnitude of the error is a smaller magnitude of the error.

7. The wireless communication device of claim 1, wherein
    the weight vector of the adaptive filter is a first weight vector of the adaptive filter; and
    the processing circuitry is configured to cause the wireless communication device to:
        detect the updated value of the phase contemporaneous with modifying the first weight vector based on the previous value of the phase, and
        modify a second weight vector of the adaptive filter corresponding to the self-interference signal in response to determining an error magnitude of the second weight vector is less than an error magnitude of the first weight vector, the second weight vector being based on the updated value of the phase.

8. A method of operating a wireless communication device, the method comprising:
    detecting that a transmission radio frequency (RF) chain has transited from an inactive state to a first active state, the transmission RF chain being configured to transmit a radio signal;
    determining whether to detect an updated value of a phase of a self-interference signal in response to the detecting; and
    modifying a weight vector of an adaptive filter corresponding to the self-interference signal based on the updated value of the phase or a previous value of the phase,
    wherein the determining determines whether to detect the updated value of the phase including determining whether a duration period of the inactive state is greater than a threshold time.

9. The method of claim 8, wherein the transmission RF chain comprises a transmission mixer, a digital-to-analog converter (DAC), and a power amplifier.

10. The method of claim 9, wherein the updated value of the phase in the first active state after the inactive state is different from the previous value of the phase in a second active state before the inactive state.

11. The method of claim 8, further comprising:
    detecting the updated value of the phase; and
    modifying the weight vector according to the updated value of the phase in response to completing the detecting the updated value of the phase.

12. The method of claim 8, further comprising:
    detecting the updated value of the phase; and
    modifying the weight vector based on the previous value of the phase during the detecting the updated value of the phase, the previous value of the phase corresponding to a time point at which the inactive state is entered.

13. The method of claim 12, further comprising:
    determining a first magnitude of an error of a first weight vector and a second magnitude of the error of a second weight vector, the first weight vector being based on the previous value of the phase, the first weight vector being modified during the detecting the updated value of the phase, and the second weight vector being based on the updated value of the phase; and
    setting one of the first weight vector or the second weight vector as the weight vector of the adaptive filter according to which among the first magnitude of the error and the second magnitude of the error is a smaller magnitude of the error.

14. The method of claim 8, wherein
    the weight vector of the adaptive filter is a first weight vector of the adaptive filter; and
    the method further comprises:
        detecting the updated value of the phase contemporaneous with the modifying the first weight vector based on the previous value of the phase, and modifying a second weight vector of the adaptive filter corresponding to the self-interference signal in response to determining an error magnitude of the second weight vector is less than an error magnitude of the first weight vector, the second weight vector being based on the updated value of the phase.

15. A wireless communication device comprising:

a transmission radio frequency (RF) chain configured to transmit a radio signal; and processing circuitry configured to cause the wireless communication device to, detect that the transmission RF chain has transited from an inactive state to a first active state, determine to detect an updated value of a phase of a self-interference signal in response to detecting that the transmission RF chain has transited from the inactive state to the first active state, detect the updated value of the phase of the self-interference signal in response to the determination, and modify a weight vector of an adaptive filter corresponding to the self-interference signal based on the updated value of the phase of the self-interference signal, wherein the processing circuitry is configured to cause the wireless communication device to determine to detect the updated value of the phase of the self-interference signal including determining whether a duration period of the inactive state is greater than a threshold time.

16. The wireless communication device of claim 15, wherein the weight vector is maintained at a first value of a phase of the weight vector in the inactive state; and the processing circuitry is configured to cause the wireless communication device to obtain a second value of the phase of the weight vector by rotating the first value of the phase of the weight vector by as much as the updated value of the phase of the self-interference signal.

17. The wireless communication device of claim 16, wherein the processing circuitry is configured to cause the wireless communication device to:

rotate the first value of the phase of the weight vector according to a phase candidate minimizing a magnitude of an error of a reception signal from among a number of phase candidates.

18. The wireless communication device of claim 16, wherein the processing circuitry is configured to cause the wireless communication device to:

map the updated value of the phase of the self-interference signal to a number of phase candidates according to a position at which the updated value of the phase of the self-interference signal is plotted on a complex plane; and rotate the first value of the phase of the weight vector based on the phase candidates.

19. The wireless communication device of claim 15, wherein the updated value of the phase of the self-interference signal in the first active state after the inactive state is different from a previous value of the phase of the self-interference signal in a second active state before the inactive state.

20. The wireless communication device of claim 19, wherein the processing circuitry is configured to cause the wireless communication device to:

determine a first magnitude of an error of a first weight vector and a second magnitude of the error of a second weight vector, the first weight vector being based on the previous value of the phase of the self-interference signal, the first magnitude of the error of the weight vector being modified during the detection of the updated value of the phase of the self-interference signal, and the second weight vector being based on the updated value of the phase of the self-interference signal; and set one of the first weight vector or the second weight vector as the weight vector of the adaptive filter according to which among the first magnitude of the error and the second magnitude of the error is a smaller magnitude of the error.

\* \* \* \* \*